United States Patent
Qu et al.

(10) Patent No.: US 11,096,035 B2
(45) Date of Patent: Aug. 17, 2021

(54) METHOD AND NODE FOR COMMUNICATION BETWEEN NEXT GENERATION CORE CONTROL FUNCTION AND NEXT GENERATION POLICY CONTROL FUNCTION

(71) Applicant: Telefonaktiebolaget LM Ericsson (publ), Stockholm (SE)

(72) Inventors: Zhiwei Qu, Shanghai (CN); Lasse Olsson, Stora Höga (SE); Hanbing Zhang, Shanghai (CN); Xiao Li, Shanghai (CN); Jie Cai, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/325,833

(22) PCT Filed: Aug. 3, 2017

(86) PCT No.: PCT/CN2017/095843
§ 371 (c)(1),
(2) Date: Feb. 15, 2019

(87) PCT Pub. No.: WO2018/032978
PCT Pub. Date: Feb. 22, 2018

(65) Prior Publication Data
US 2019/0208402 A1    Jul. 4, 2019

(30) Foreign Application Priority Data
Aug. 16, 2016   (WO) ................ PCT/CN2016/095507

(51) Int. Cl.
*H04W 8/08* (2009.01)
*H04L 12/14* (2006.01)
(Continued)

(52) U.S. Cl.
CPC .............. *H04W 8/08* (2013.01); *H04L 12/14* (2013.01); *H04L 12/1407* (2013.01);
(Continued)

(58) Field of Classification Search
CPC ......... H04W 8/08; H04W 4/24; H04W 48/16; H04W 48/18; H04W 72/10;
(Continued)

(56) References Cited

U.S. PATENT DOCUMENTS 9,319,976 B2 * 4/2016 Chen ..................... H04W 48/18
2007/0281699 A1 * 12/2007 Rasanen ........... H04W 36/0038
455/436
(Continued)

FOREIGN PATENT DOCUMENTS

CN       201374247 A     2/2009
CN       103458468 A    12/2013
(Continued)

OTHER PUBLICATIONS

Author Unknown, "Technical Specification Group Services and System Aspects; Study on system enhancements for user plane congestion management (Release 13)," Technical Report 23.705, Version 13.0.0, 3GPP Organizational Partners, Dec. 2014, 61 pages.
(Continued)

*Primary Examiner* — Wayne H Cai
(74) *Attorney, Agent, or Firm* — Sage Patent Group (57) ABSTRACT

The present disclosure provides a method in a Next Generation Core Control Function (NG-CCF) node for communication with a Next Generation Policy Control Function (NG-PCF) node. The method comprises: communicating network related parameters with the NG-PCF node via a direct interface between the NG-CCF node and the NG-PCF node.

16 Claims, 5 Drawing Sheets

(51) Int. Cl.
  *H04M 15/00* (2006.01)
  *H04W 4/24* (2018.01)
  *H04L 12/24* (2006.01)
  *H04W 48/16* (2009.01)
  *H04W 48/18* (2009.01)
  *H04W 72/10* (2009.01)

(52) U.S. Cl.
  CPC ........ *H04L 41/0893* (2013.01); *H04M 15/00* (2013.01); *H04M 15/66* (2013.01); *H04M 15/8033* (2013.01); *H04W 4/24* (2013.01); *H04W 48/16* (2013.01); *H04W 48/18* (2013.01); *H04W 72/10* (2013.01)

(58) Field of Classification Search
  CPC ............... H04W 41/0893; H04L 12/14; H04L 12/1407; H04M 15/00; H04M 15/66; H04M 15/8033
  See application file for complete search history.

(56) References Cited

U.S. PATENT DOCUMENTS

| | | | |
|---|---|---|---|
| 2012/0084371 A1* | 4/2012 | Rajagopalan | H04L 41/5054 709/206 |
| 2013/0053027 A1 | 2/2013 | Lau et al. | |
| 2015/0244537 A1* | 8/2015 | Paquette | H04W 4/24 370/259 |
| 2017/0374608 A1* | 12/2017 | Li | H04W 48/08 |
| 2019/0327636 A1* | 10/2019 | Dao | H04W 28/0268 |

FOREIGN PATENT DOCUMENTS

| | | |
|---|---|---|
| WO | 2013053896 A1 | 4/2013 |
| WO | 2013060356 A1 | 5/2013 |
| WO | 2018032350 A1 | 2/2018 |

OTHER PUBLICATIONS

Author Unknown, "Technical Specification Group Services and System Aspects; Study on Architecture for Next Generation System (Release 14)," Technical Report 23.799, Version 0.6.0, 3GPP Organizational Partners, Jul. 2016, 321 pages.

Author Unknown, "Technical Specification Group Services and System Aspects; Study on Architecture for Next Generation System (Release 14)," Technical Report 23.799, Version 0.8.0, 3GPP Organizational Partners, Sep. 2016, 423 pages.

Author Unknown, "Technical Specification Group Services and System Aspects; General Packet Radio Service (GPRS); Service description; Stage 2 (Release 12)," Technical Specification 23.060, Version 12.0.0, 3GPP Organizational Partners, Mar. 2013, 338 pages.

Author Unknown, "Technical Specification Group Services and System Aspects; Policy and charging control architecture (Release 12)," Technical Specification 23.203, Version 12.3.0, 3GPP Organizational Partners, Dec. 2013, 215 pages.

Author Unknown, "Technical Specification Group Services and System Aspects; General Packet Radio Service (GPRS) enhancements for Evolved Universal Terrestrial Radio Access Network (E-UTRAN) access (Release 12)," Technical Specification 23.401, Version 12.0.0, 3GPP Organizational Partners, Mar. 2013, 290 pages.

Author Unknown, "Technical Specification Group Services and System Aspects; System Architecture for the 5G System; Stage 2 (Release 15)," Technical Specification 23.501, Version 0.1.0, 3GPP Organizational Partners, Jan. 2017, 67 pages.

Author Unknown, "Technical Specification Group Core Network and Terminals; Mobile radio interface Layer 3 specification; Core network protocols; Stage 3 (Release 12)," Technical Specification 24.008, Version 12.6.0, 3GPP Organizational Partners, Jun. 2014, 698 pages.

Author Unknown, "Technical Specification Group Core Network and Terminals; Non-Access-Stratum (NAS) protocol for Evolved Packet System (EPS); Stage 3 (Release 12)," Technical Specification 24.301, Version 12.5.0, 3GPP Organizational Partners, Jun. 2014, 367 pages.

Cisco Systems, Inc., et al., "S2-166257: Interim agreements for KI 7," Third Generation Partnership Project (3GPP), SA WG2 Meeting #117, Oct. 17-21, 2016, 12 pages, Kaohsiung City, Taiwan.

Ericsson, "S2-161782: Core Network Architecture & Functional Allocation," Third Generation Partnership Project (3GPP), SA WG2 Meeting #114, Apr. 11-15, 2016, 7 pages, Sophia Antipolis, France.

Nokia, et al., "S2-164197: Next Generation Network Architecture," Third Generation Partnership Project (3GPP), SA WG2 Meeting #116, Jul. 11-15, 2016, 8 pages, Vienna, Austria.

International Search Report and Written Opinion for International Patent Application No. PCT/CN2016/095507, dated May 19, 2017, 11 pages.

International Search Report and Written Opinion for International Patent Application No. PCT/CN2017/095843, dated Oct. 19, 2017, 12 pages.

China Mobile; "Network Architecture Reference Model", 3GPP Draft; S2-163343_Network Architecture Reference Model—CMCCV0.6; 3rd Generation Partnership Project (3GPP); Mobile Competence Centre; vol. SA WG2, No. Vienna; Jul. 2016; XP051121083.

Extended European Search Report issued in corresponding application No. 17840953.8 dated Feb. 26, 2020, 7 pages. The reference not cited herein has previously been made of record.

* cited by examiner

METHOD AND NODE FOR COMMUNICATION BETWEEN NEXT GENERATION CORE CONTROL FUNCTION AND NEXT GENERATION POLICY CONTROL FUNCTION

This application is a 35 U.S.C. § 371 national phase filing of International Application No. PCT/CN2017/095843, filed Aug. 3, 2017, which claims the benefit of International Application No. PCT/CN2016/095507, filed Aug. 16, 2016, the disclosures of which are incorporated herein by reference in their entireties.

TECHNICAL FIELD

The present disclosure relates to communication technology, and more particularly, to methods and nodes for communication between Next Generation Core Control Function (NG-CCF) and Next Generation Policy Control Function (NG-PCF).

BACKGROUND

The $3^{rd}$ Generation Partnership Project (3GPP) Technical Specification (TS) 23.203 V12.3.0, which is incorporated here in its entirety by reference, specifies a Policy and Charging Control (PCC) functionality for the evolved 3GPP packet switched domain, including both 3GPP accesses (GSM EDGE Radio Access Network (GERAN)/UMTS Terrestrial Radio Access Network (UTRAN)/Evolve UTRAN (E-UTRAN)) and Non-3GPP accesses.

Figure 1:
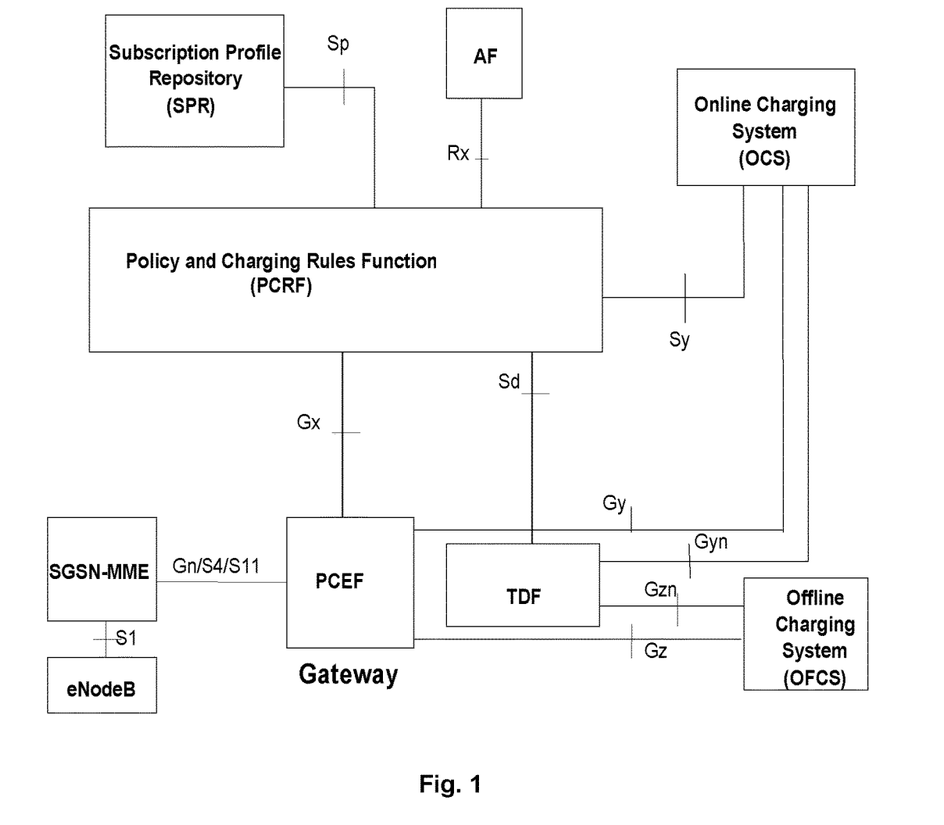
FIG. 1 is a schematic diagram showing a network architecture supporting the PCC functionality as specified in 3GPP TS 23.203 V12.3.0.

FIG. 1 shows a network architecture, including functional nodes and interfaces, that supports the PCC functionality, as specified in 3GPP TS 23.203 V12.3.0.

As shown, a Policy and Charging Rules Function (PCRF) is a functional element that encompasses policy control decision and flow based charging control functionalities. The PCRF provides network control including service data flow detection, gating, Quality of Service (QoS) and flow based charging (except credit management) towards a Policy and Charging Enforcement Function (PCEF). The PCRF receives session and media related information from an Application Function (AF) and informs the AF of traffic plane events. The PCRF provides PCC rules to the PCEF via a Gx reference point or interface. The PCRF informs the PCEF, through the use of PCC rules, of handling of each service data flow that is under PCC control, in accordance with PCRF policy decisions.

A Serving GPRS Support Node and Mobility Management Entity (SGSN-MME) provides packet-data switching and mobility/session management in Global System for Mobile Communications (GSM), Wideband Code Division Multiple Access (WCDMA) and Long Term Evolution (LTE) networks. While the MME is responsible for tracking and paging procedures in an Evolved Packet Switch (EPS) network with E-UTRAN access, the SGSN plays a similar role for GERAN/UTRAN towards a GPRS core network. For GERAN/UTRAN access to an EPS network, the S4-SGSN can be used instead. For details of other functional nodes and interfaces shown in FIG. 1, reference can be made to 3GPP TS 23.203 V12.3.0 and the description thereof will be omitted here.

WO 2013/053896 A1, which is incorporated here in its entirety by reference, discloses an interface between the SGSN-MME and the PCRF, referred to as Sx interface hereinafter. The Sx interface (which may also be called Smp interface) enables provision of mobility policies (e.g., for selection of Packet Data Network Gateway (PDN-GW, or PGW)/Gateway GPRS Supporting Node (GGSN)) from the PCRF to the SGSN-MME and transmission of access network information (e.g., location information) from the SGSN-MME to the PCRF.

Figure 2:
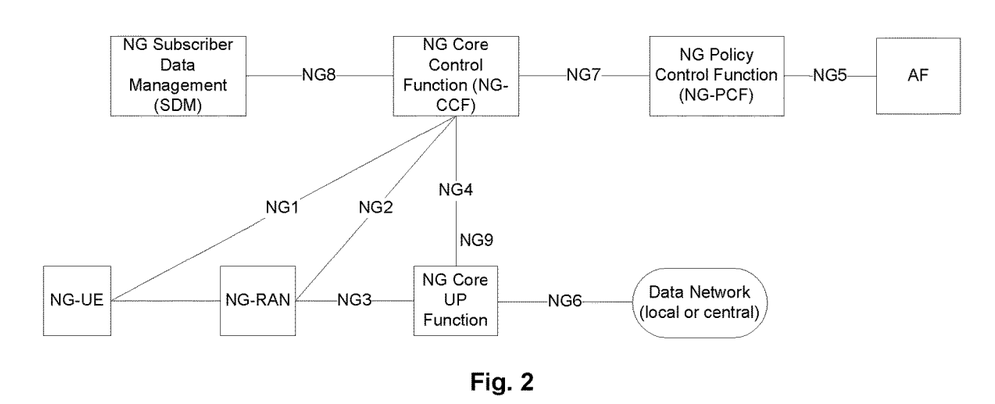
FIG. 2 is a schematic diagram showing an architecture for the next generation system.

3GPP Temporary Document (TD) S2-164197, Next Generation Network Architecture, SA WG2 Meeting #116, 11-15 Jul. 2016, Vienna, AT, which is incorporated here in its entirety by reference, proposes an architecture for the next generation system, as shown in FIG. 2. In this architecture, the core network functions (including SGSN-MME, Service Gateway (SGW) and PGW) will be combined into one logical entity, Next Generation Core Control Function (NG-CCF). Also, a new logical entity, Next Generation Policy Control Function (NG-PCF), is provided for the PCC functionality. The NG-PCF supports unified policy framework to govern network behavior and provides policy rules to control plane functions to enforce them.

There is thus a need for enabling communication between the NG-CCF and the NG-PCF in the next generation network architecture.

SUMMARY

It is an object of the present disclosure to provide methods and nodes for communication between the NG-CCF and the NG-PCF.

In a first aspect, a method in a Next Generation Core Control Function (NG-CCF) node for communication with a Next Generation Policy Control Function (NG-PCF) node is provided. The method comprises: communicating network related parameters with the NG-PCF node via a direct interface between the NG-CCF node and the NG-PCF node.

In an embodiment, the network related parameters are associated with a mobility-based policy feature.

In an embodiment, the step of communicating comprises: transmitting to the NG-PCF node a request for a mobility policy and receiving the mobility policy from the NG-PCF node. The mobility policy is associated with one or more of: Location-Based Service (LBS), Next Generation User Plane (NG-UP) selection, Radio Access Technology (RAT)/Frequency Selection Priority (RFSP) selection and mobility preference information handling.

In an embodiment, the step of communicating comprises: receiving from the NG-PCF node a request to modify a mobility policy associated with one or more of LBS, NG-UP selection, RFSP selection and mobility preference information handling.

In an embodiment, the NG-CCF node is an Access and Mobility Management Function (AMF) node.

In a second aspect, a Next Generation Core Control Function (NG-CCF) node is provided for communication with a Next Generation Policy Control Function (NG-PCF) node. The NG-CCF node comprises a communication unit configured to communicate network related parameters with the NG-PCF node via a direct interface between the NG-CCF node and the NG-PCF node.

In a third aspect, a Next Generation Core Control Function (NG-CCF) node is provided for communication with a Next Generation Policy Control Function (NG-PCF) node. The NG-CCF node comprises a transceiver, a processor and a memory. The memory contains instructions executable by the processor whereby the NG-CCF node is operative to perform the method according to the above first aspect.

The above embodiments of the first aspect are also applicable for the second and third aspects.

In a fourth aspect, a method in a Next Generation Policy Control Function (NG-PCF) node for communication with a Next Generation Core Control Function (NG-CCF) node is provided. The method comprises communicating network related parameters with the NG-CCF node via a direct interface between the NG-CCF node and the NG-PCF node.

In an embodiment, the network related parameters are associated with a mobility-based policy feature.

In an embodiment, the step of communicating comprises: receiving from the NG-CCF node a request for a mobility policy and transmitting the mobility policy to the NG-CCF node. The mobility policy is associated with one or more of Location-Based Service (LBS), Next Generation User Plane (NG-UP) selection and/or Radio Access Technology (RAT)/Frequency Selection Priority (RFSP) selection and mobility preference information handling.

In an embodiment, the step of communicating comprises transmitting to the NG-CCF node a request to modify a mobility policy associated with one or more of LBS, NG-UP selection, RFSP selection and mobility preference information handling.

In an embodiment, the NG-CCF node is an Access and Mobility Management Function (AMF) node.

In a fifth embodiment, a Next Generation Policy Control Function (NG-PCF) node is provided for communication with a Next Generation Core Control Function (NG-CCF) node. The NG-PCF node comprises a communication unit configured to communicate network related parameters with the NG-CCF node via a direct interface between the NG-CCF node and the NG-PCF node.

In a sixth embodiment, a Next Generation Policy Control Function (NG-PCF) node is provided for communication with a Next Generation Core Control Function (NG-CCF) node. The NG-PCF node comprises a transceiver, a processor and a memory. The memory contains instructions executable by the processor whereby the NG-PCF node is operative to perform the method according to the above fourth aspect.

The above embodiments of the fourth aspect are also applicable for the fifth and sixth aspects.

With the embodiments of the present disclosure, a direct interface is introduced between the NG-CCF node and the NG-PCF node, such that network related parameters can be communicated between the NG-CCF node and the NG-PCF node.

BRIEF DESCRIPTION OF THE DRAWINGS

The above and other objects, features and advantages will be more apparent from the following description of embodiments with reference to the figures, in which.

DETAILED DESCRIPTION

The embodiments of the disclosure will be detailed below with reference to the drawings. It should be appreciated that the following embodiments are illustrative only, rather than limiting the scope of the disclosure.

Figure 3:
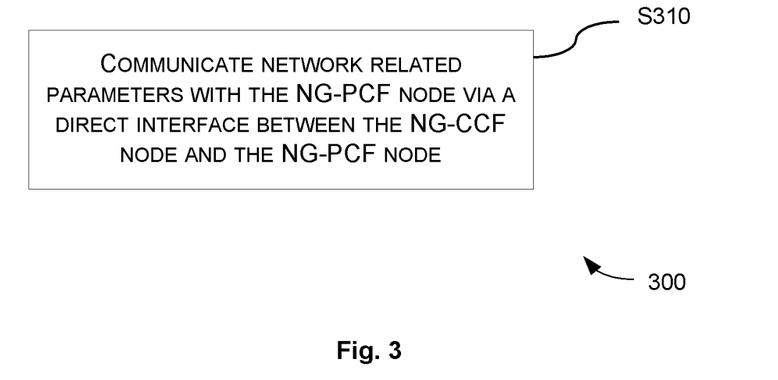
FIG. 3 is a flowchart illustrating a method in a NG-CCF node for communication with a NG-PCF node according to an embodiment of the present disclosure.

FIG. 3 is a flowchart illustrating a method 300 in a NG-CCF node (e.g., the NG-CCF node shown in FIG. 2) for communication with a NG-PCF node (e.g., the NG-PCF node shown in FIG. 2) according to an embodiment of the present disclosure. The NG-CCF node can be an Access and Mobility Management Function (AMF) node in 5G system architecture as defined in 3GPP TS 23.501 v0.1.0. The method 300 includes step S310, where the NG-CCF node communicates network related parameters with the NG-PCF node via a direct interface between the NG-CCF node and the NG-PCF node.

In an example, the network related parameters can be associated with a mobility-based policy feature.

For example, in the step S310, the NG-CCF node can transmit to the NG-PCF node a request for a mobility policy. Then, the NG-CCF node can receive the mobility policy from the NG-PCF node.

Alternatively, in the step S310, the NG-CCF node can receive from the NG-PCF node a request to modify a mobility policy.

All these transmitting and receiving operations can be carried out via the direct interface between the NG-CCF node and the NG-PCF node.

As an example, the mobility policy can be associated with a Location-Based Service (LBS). In this case, the NG-CCF node can report location information related to a terminal device (e.g., a Next Generation User Equipment (NG-UE) shown in FIG. 2) to the NG-PCF node via the direct interface, such that the NG-PCF node can provide a LBS-related policy to the NG-CCF node based on the location information. Additionally or alternatively, the mobility policy can be associated with Next Generation User Plane (NG-UP) selection and/or Radio Access Technology (RAT)/Frequency Selection Priority (RFSP) selection. Additionally or alternatively, the mobility policy can be associated with mobility preference information handling. For example, the NG-PCF node can push mobility preference information to the NG-CCF node via the direct interface. Upon receiving a request for mobility preference information from e.g., a Next Generation Radio Access Network (NG-RAN) shown in FIG. 2, the NG-CCF node can forward the mobility preference information to the NG-RAN.

In an embodiment, the direct interface can be further configured to serve as a Gx interface as specified in 3GPP TS 23.203 V12.3.0. That is, the direct interface can double as the Smp interface and the Gx interface.

Figure 4:
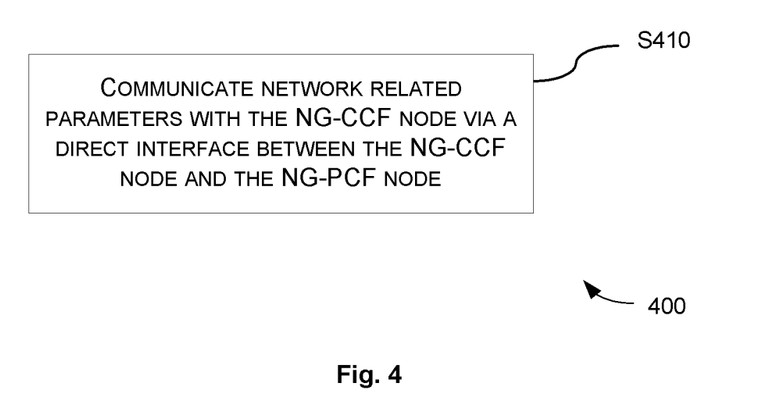
FIG. 4 is a flowchart illustrating a method in a NG-PCF node for communication with a NG-CCF node according to an embodiment of the present disclosure.

FIG. 4 is a flowchart illustrating a method 400 in a NG-PCF node (e.g., the NG-PCF node shown in FIG. 2) for communication with a NG-CCF node (e.g., the NG-CCF node shown in FIG. 2) according to an embodiment of the present disclosure. The method 400 includes step S410, where the NG-PCF node communicates network related parameters with the NG-CCF node via a direct interface between the NG-CCF node and the NG-PCF node.

As in the above method 300, the network related parameters are associated with a mobility-based policy feature.

Accordingly, in the step S410, the NG-PCF node can receive from the NG-CCF node a request for a mobility policy. Then, the NG-PCF node can transmit the mobility policy to the NG-CCF node.

Alternatively, in the step S410, the NG-PCF node can transmit to the NG-CCF node a request to modify a mobility policy.

As in the above method 300, the mobility policy can be associated with one or more of LBS, NG-UP selection, RFSP selection and mobility preference information handling.

In an embodiment, the direct interface can be further configured to serve as a Gx interface as specified in 3GPP TS 23.203 V12.3.0.

Figure 5:
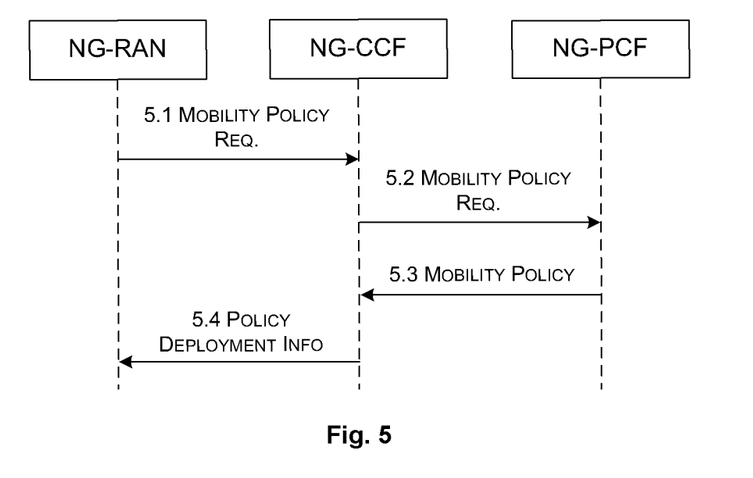
FIG. 5 is a schematic diagram showing a signaling sequence according to an embodiment of the present disclosure.

FIG. 5 is a schematic diagram showing a signaling sequence of a mobility policy related procedure according to an embodiment of the present disclosure.

As shown, at 5.1, the NG-RAN sends to the NG-CCF node a request for a mobility policy for a NG-UE. At 5.2, the NG-CCF node sends a request for a mobility policy to the NG-PCF node via the direct interface between the NG-CCF node and the NG-PCF node, including parameters such as a UE identity, a PDN identifier, a RAT and/or mobility policy code indicator, and/or location change information. The UE identity and the PDN identifier are used to identify a UE and, in NG-PCF selection, to locate a NG-PCF node with a corresponding Internet Protocol-Connectivity Access Network (IP-CAN) session. The NG-CCF node may send to the NG-PCF node additional parameters such as core network capabilities and restrictions, RAN capabilities and restrictions, UE capabilities and restrictions, and/or any other information available in the core network that is relevant to the UE and its associated connection. At 5.3, the NG-PCF node sends a mobility policy to the NG-CCF node via the direct interface. As described above, the mobility policy may be associated with one or more of LBS, NG-UP selection, RFSP selection and mobility preference information handling. The NG-PCF node may also provide the NG-CCF node with UE level information, such as quota limits and subscription information. The NG-PCF node may also subscribe to event notifications from the NG-CCF node, including e.g., location changes, RAT changes or any other information associated with the UE available in the core network. The NG-CCF node can use the mobility policy received from the NG-PCF node, for LBS, NG-UP selection, RFSP selection and/or mobility preference information handling. At 5.4, the NG-CCF node sends information on deployment of the mobility policy, including UE level information, to the NG-RAN, so as to deploy the mobility policy in the NG-RAN.

Figure 6:
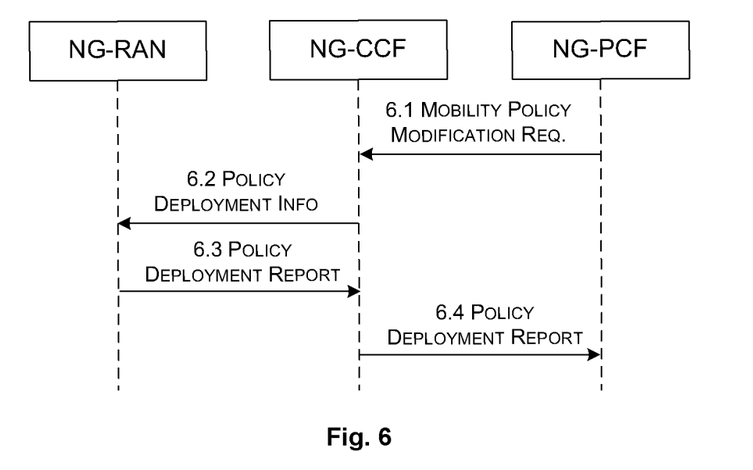
FIG. 6 is a schematic diagram showing a signaling sequence according to another embodiment of the present disclosure.

FIG. 6 is a schematic diagram showing a signaling sequence of a mobility policy related procedure according to another embodiment of the present disclosure.

At 6.1, the NG-PCF node sends a request to modify a mobility policy to the NG-CCF node via the direct interface between the NG-CCF node and the NG-PCF node. As described above, the mobility policy may be associated with one or more of LBS, NG-UP selection, RFSP selection and mobility preference information handling. The request may include a radio frequency selection priority and/or a mobility policy data, such as quota limits and subscription information, for a specific UE or PDN. At 6.2, the NG-CCF node sends information on deployment of the modified mobility policy, including UE level information, to the NG-RAN, so as to deploy the modified mobility policy in the NG-RAN. The NG-CCF node can use the mobility policy received from the NG-PCF node, for LBS, NG-UP selection, RFSP selection and/or mobility preference information handling. At 6.3, the NG-RAN sends a report regarding the deployment of the mobility policy to the NG-CCF node. At 6.4, the NG-CCF node forwards the report to the NG-PCF node via the direct interface.

Figure 7:
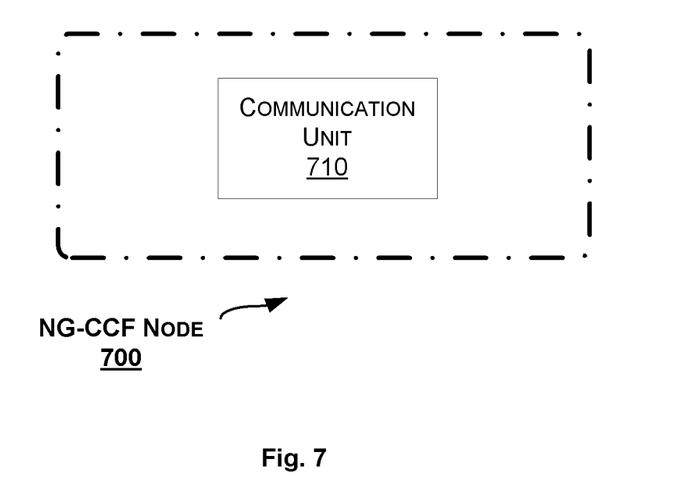
FIG. 7 is a block diagram of a NG-CCF node according to an embodiment of the present disclosure.

Correspondingly to the method 300 as described above, a NG-CCF node is provided. FIG. 7 is a block diagram of a NG-CCF node 700 for communication with an NG-PCF node according to an embodiment of the present disclosure.

As shown in FIG. 7, the NG-CCF node 700 includes a communication unit 710. The communication unit 710 is configured to communicate network related parameters with the NG-PCF node via a direct interface between the NG-CCF node and the NG-PCF node.

In an embodiment, the network related parameters are associated with a mobility-based policy feature.

In an embodiment, the communication unit 710 is configured to transmit to the NG-PCF node a request for a mobility policy and receive the mobility policy from the NG-PCF node. The mobility policy is associated with one or more of Location-Based Service (LBS), Next Generation User Plane (NG-UP) selection, Radio Access Technology (RAT)/Frequency Selection Priority (RFSP) selection and mobility preference information handling.

In an embodiment, the communication unit 710 is configured to receive from the NG-PCF node a request to modify a mobility policy associated with one or more of LBS, NG-UP selection, RFSP selection and mobility preference information handling.

In an embodiment, the direct interface is further configured to serve as a Gx interface.

The communication unit 710 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 3.

Figure 8:
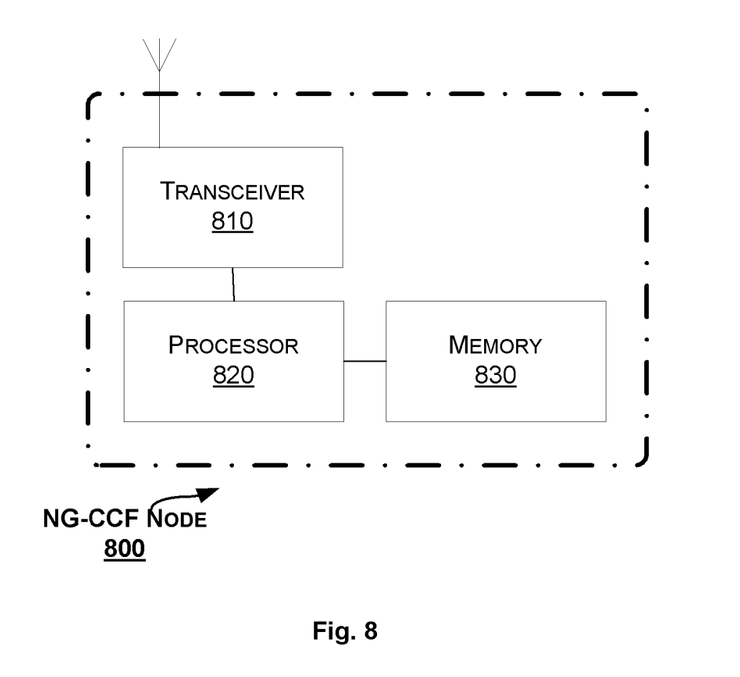
FIG. 8 is a block diagram of a NG-CCF node according to another embodiment of the present disclosure.

FIG. 8 is a block diagram of a NG-CCF node 800 according to another embodiment of the present disclosure. The NG-CCF node 800 can be provided for communication with an NG-PCF node.

The NG-CCF node 800 includes a transceiver 810, a processor 820 and a memory 830. The memory 830 contains instructions executable by the processor 820 whereby the NG-CCF node 800 is operative to perform the actions, e.g., of the procedure described earlier in conjunction with FIG. 3. Particularly, the memory 830 contains instructions executable by the processor 820 whereby the NG-CCF node 800 is operative to communicate network related parameters with the NG-PCF node via a direct interface between the NG-CCF node and the NG-PCF node.

Figure 9:
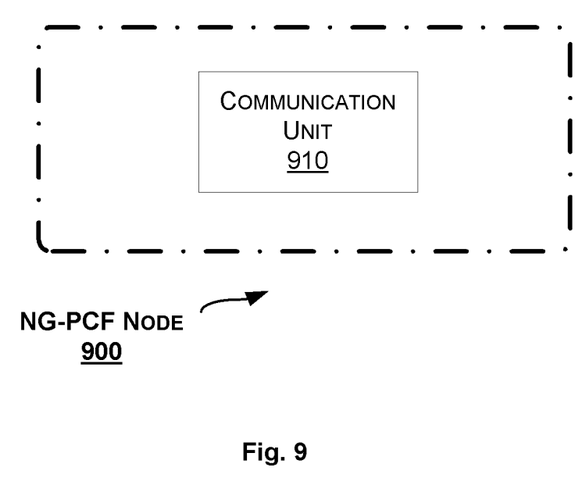
FIG. 9 is a block diagram of a NG-PCF node according to an embodiment of the present disclosure.

Correspondingly to the method 400 as described above, a NG-PCF node is provided. FIG. 9 is a block diagram of a NG-PCF node 900 for communication with an NG-CCF node according to an embodiment of the present disclosure.

As shown in FIG. 9, the NG-PCF node 900 includes a communication unit 910. The communication unit 910 is configured to communicate network related parameters with the NG-CCF node via a direct interface between the NG-CCF node and the NG-PCF node.

In an embodiment, the network related parameters are associated with a mobility-based policy feature.

In an embodiment, the communication unit 910 is configured to: receive from the NG-CCF node a request for a mobility policy and transmit the mobility policy to the NG-CCF node. The mobility policy is associated with one or more of Location-Based Service (LBS), Next Generation User Plane (NG-UP) selection and/or Radio Access Technology (RAT)/Frequency Selection Priority (RFSP) selection and mobility preference information handling.

In an embodiment, the communication unit 910 is configured to transmit to the NG-CCF node a request to modify a mobility policy associated with one or more of LBS, NG-UP selection, RFSP selection and mobility preference information handling.

In an embodiment, the direct interface is further configured to serve as a Gx interface.

The communication unit 910 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 4.

Figure 10:
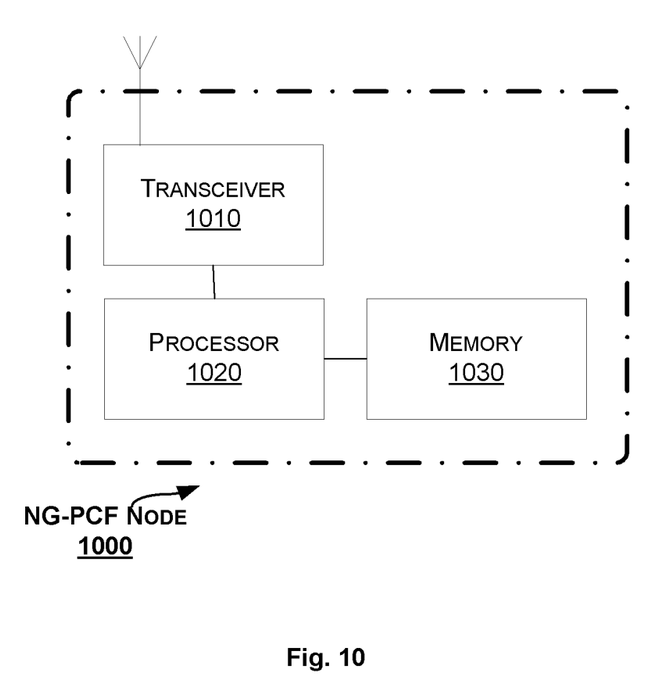
FIG. 10 is a block diagram of a NG-PCF node according to another embodiment of the present disclosure.

FIG. 10 is a block diagram of a NG-PCF node 1000 according to another embodiment of the present disclosure. The NG-PCF node 1000 can be provided for communication with an NG-CCF node.

The NG-PCF node 1000 includes a transceiver 1010, a processor 1020 and a memory 1030. The memory 1030 contains instructions executable by the processor 1020 whereby the NG-PCF node 1000 is operative to perform the actions, e.g., of the procedure described earlier in conjunction with FIG. 4. Particularly, the memory 1030 contains instructions executable by the processor 1020 whereby the NG-PCF node 1000 is operative to communicate network related parameters with the NG-CCF node via a direct interface between the NG-CCF node and the NG-PCF node.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 820 causes the NG-CCF node 800 to perform the actions, e.g., of the procedure described earlier in conjunction with FIG. 3; or code/computer readable instructions, which when executed by the processor 1020 causes the NG-PCF node 1000 to perform the actions, e.g., of the procedure described earlier in conjunction with FIG. 4.

The computer program product may be configured as a computer program code structured in computer program modules. The computer program modules could essentially perform the actions of the flow illustrated in FIG. 3 or 4.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a Next Generation Core Control Function (NG-CCF) node for communication with a Next Generation Policy Control Function (NG-PCF) node, the method comprising:
   communicating network related parameters with the NG-PCF node via a direct interface between the NG-CCF node and the NG-PCF node, wherein the NG-CCF node is an Access and Mobility Management Function (AMF) node, and wherein communicating the network related parameters comprises:
      transmitting, to the NG-PCF node, a request for a mobility policy associated with one or more of Location-Based Service (LBS) and Next Generation User Plane (NG-UP) selection; and
      receiving the mobility policy from the NG-PCF node.

2. The method of claim 1, wherein the mobility policy is further associated with one or more of mobility preference information handling and Radio Access Technology (RAT)/Frequency Selection Priority (RFSP) selection.

3. The method of claim 1, wherein communicating the network related parameters further comprises:
   receiving, from the NG-PCF node, a request to modify the mobility policy associated with one or more of the LBS and the NG-UP selection.

4. The method of claim 1, wherein the direct interface is further configured to serve as a Gx interface.

5. A Next Generation Core Control Function (NG-CCF) node for communication with a Next Generation Policy Control Function (NG-PCF) node, the NG-CCF node comprising a transceiver, a processor, and memory, the memory containing instructions to cause the processor to:
   communicate network related parameters with the NG-PCF node via a direct interface between the NG-CCF node and the NG-PCF node, wherein the NG-CCF node is an Access and Mobility Management Function (AMF) node, and wherein to communicate the network related parameters, the instructions further cause the processor to:
      transmit, to the NG-PCF node, a request for a mobility policy associated with one or more of Location-Based Service (LBS) and Next Generation User Plane (NG-UP) selection; and
      receive the mobility policy from the NG-PCF node.

6. The NG-CCF node of claim 5, wherein the mobility policy is further associated with one or more of mobility preference information handling and Radio Access Technology (RAT)/Frequency Selection Priority (RFSP) selection.

7. The NG-CCF node of claim 5, wherein to communicate the network related parameters, the instructions further cause the processor to receive, from the NG-PCF node, a request to modify the mobility policy associated with one or more of the LBS and the NG-UP selection.

8. The NG-CCF node of claim 5, wherein the direct interface is further configured to serve as a Gx interface.

9. A method in a Next Generation Policy Control Function (NG-PCF) node for communication with a Next Generation Core Control Function (NG-CCF) node, the method comprising:
communicating network related parameters with the NG-CCF node via a direct interface between the NG-CCF node and the NG-PCF node, wherein the NG-CCF node is an Access and Mobility Management Function (AMF) node, and wherein communicating the network related parameters comprises:
receiving, from the NG-CCF node, a request for a mobility policy associated with one or more of Location-Based Service (LBS) and Next Generation User Plane (NG-UP) selection; and
transmitting the mobility policy to the NG-CCF node.

10. The method of claim 9, wherein the mobility policy is further associated with one or more of mobility preference information handling and Radio Access Technology (RAT)/Frequency Selection Priority (RFSP) selection.

11. The method of claim 9, wherein communicating the network related parameters further comprises:
transmitting, to the NG-CCF node, a request to modify the mobility policy associated with one or more of the LBS and the NG-UP selection.

12. The method of claim 9, wherein the direct interface is further configured to serve as a Gx interface.

13. A Next Generation Policy Control Function (NG-PCF) node for communication with a Next Generation Core Control Function (NG-CCF) node, the NG-PCF node comprising a transceiver, a processor, and memory, the memory containing instructions to cause the processor to:
communicate network related parameters with the NG-CCF node via a direct interface between the NG-CCF node and the NG-PCF node, wherein the NG-CCF node is an Access and Mobility Management Function (AMF) node, and wherein to communicate the network related parameters, the instructions further cause the processor to:
receive, from the NG-CCF node, a request for a mobility policy associated with one or more of Location-Based Service (LBS) and Next Generation User Plane (NG-UP) selection; and
transmit the mobility policy to the NG-CCF node.

14. The NG-PCF node of claim 13, wherein the mobility policy is further associated with one or more of mobility preference information handling and Radio Access Technology (RAT)/Frequency Selection Priority (RFSP) selection.

15. The NG-PCF node of claim 13, wherein to communicate the network related parameters, the instructions further cause the processor to transmit, to the NG-CCF node, a request to modify the mobility policy associated with one or more of the LBS and the NG-UP selection.

16. The NG-PCF node of claim 13, wherein the direct interface is further configured to serve as a Gx interface.

* * * * *